(12) United States Patent
Kim et al.

(10) Patent No.: US 7,355,953 B2
(45) Date of Patent: Apr. 8, 2008

(54) OPTICAL PICKUP FOR CUTTING OFF OPTICAL NOISE AND OPTICAL RECORDING AND/OR REPRODUCING APPARATUS USING THE SAME

(75) Inventors: Ui-yol Kim, Suwon-si (KR);
Byung-ryul Ryoo, Suwon-si (KR);
Pyong-yong Seong, Seoul (KR);
Myoung-cheol Cho, Seoul (KR);
Kyung-ui Park, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 526 days.

(21) Appl. No.: 10/686,785

(22) Filed: Oct. 17, 2003

(65) Prior Publication Data
US 2004/0179456 A1 Sep. 16, 2004

(30) Foreign Application Priority Data
Oct. 18, 2002 (KR) ...................... 10-2002-0063845

(51) Int. Cl.
*G11B 7/125* (2006.01)
(52) U.S. Cl. ................................. 369/112.07; 369/47.5
(58) Field of Classification Search ........... 369/112.05, 369/112.07, 47.5
See application file for complete search history.

(56) References Cited
U.S. PATENT DOCUMENTS 4,690,558 A * 9/1987 Tsunoyama et al. ........ 356/318
4,750,161 A * 6/1988 Takeuchi et al. .......... 369/44.11
5,066,129 A * 11/1991 Matsui ....................... 356/499
5,206,852 A * 4/1993 Kim et al. .............. 369/112.18
5,283,434 A * 2/1994 Ishizuka et al. ........ 250/237 G
5,450,237 A * 9/1995 Yoshida et al. ............. 359/562
5,719,835 A * 2/1998 Ishika ..................... 369/44.26
6,346,695 B2 * 2/2002 Yanagawa et al. .......... 250/205
6,584,060 B1 * 6/2003 Oohchida et al. ...... 369/112.05
6,674,709 B1 * 1/2004 Asada et al. ........... 369/112.01
6,850,360 B1 * 2/2005 Chen et al. ................. 359/334

FOREIGN PATENT DOCUMENTS

JP 60-257584 12/1985
KR 10-294886 B1 4/2004

* cited by examiner

*Primary Examiner*—Gautam R. Patel
(74) *Attorney, Agent, or Firm*—Staas & Halsey LLP

(57) ABSTRACT

An optical pickup includes a light source which emits light, a grating which separates a portion of the light emitted from the light source, a reflecting member which reflects another portion of the light emitted from the light source, a monitoring photodetector disposed on a traveling path of the light reflected from the reflecting member and which measures the reflected light, an optical path changer which changes an optical path of the light separated by the grating, an objective lens light which condenses the light the optical path of which is changed onto a disc, and a signal detecting photodetector which receives the light reflected from the disc.

18 Claims, 5 Drawing Sheets

OPTICAL PICKUP FOR CUTTING OFF OPTICAL NOISE AND OPTICAL RECORDING AND/OR REPRODUCING APPARATUS USING THE SAME

CROSS-REFERENCE TO RELATED APPLICATIONS

This application claims the priority of Korean Patent Application No. 2002-63845, filed on Oct. 18, 2002, in the Korean Intellectual Property Office, the disclosure of which is incorporated herein in its entirety by reference.

BACKGROUND OF THE INVENTION

1. Field of the Invention

The present invention relates to an optical pickup having an improved structure such that optical noise due to reflection of light by a signal detecting photodetector is not received by a monitoring photodetector, thereby enabling the monitoring photodetector to accurately determine the power of recording light, and an optical recording and/or reproducing apparatus using the same.

2. Description of the Related Art

Generally, optical pickups are used in optical recording and/or reproducing apparatuses for recording onto and/or reproducing information from optical recording media, such as, for example, optical discs. An optical pickup irradiates light onto a recording surface of an optical disc and receives light reflected from the optical disc while moving along a radial direction of the optical disc so that information is recorded onto and/or reproduced from the optical disc.

Figure 1:
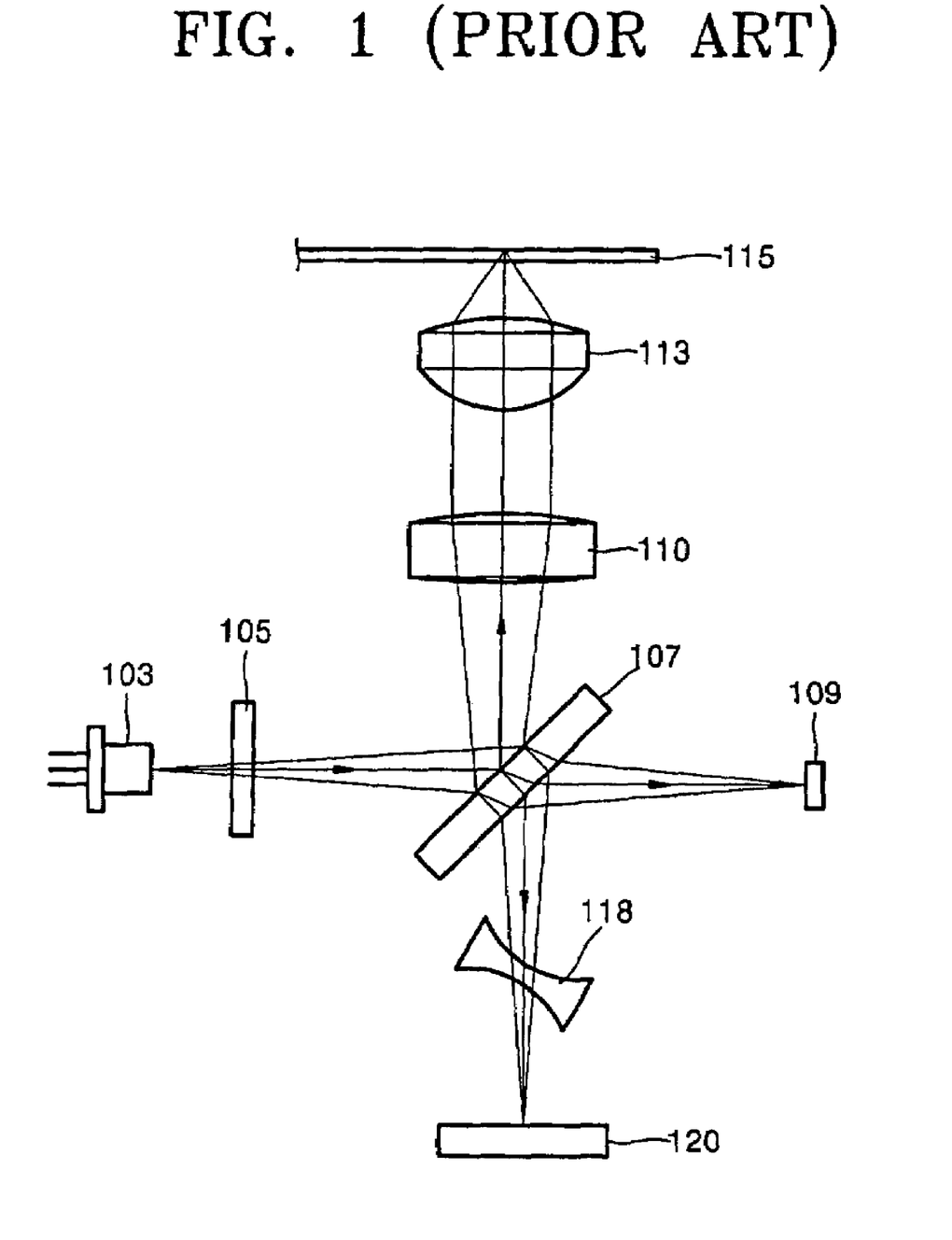
FIG. 1 shows a conventional optical pickup.

In a conventional optical pickup shown in FIG. 1, a portion of light emitted from a light source 103 is reflected by a beam splitter 107, and the remainder of the light is transmitted by the beam splitter 107. The light reflected from the beam splitter 107 passes through a collimating lens 110 and becomes parallel light. Thereafter, the parallel light passes through an objective lens 113 and is condensed on a disc 115.

The light reflected from the disc 115 passes through the objective lens 113, the collimating lens 110, and the beam splitter 107 and is received by a signal detecting photodetector 120. A light signal received by the signal detecting photodetector 120 is converted into an electric signal so that a signal recorded on the disc 115 is reproduced.

Meanwhile, a grating 105 is provided between the light source 103 and the beam splitter 107. The light emitted from the light source 103 is separated into three beams by the grating 105, and a tracking error signal is detected by a three-beam method using the three beams.

An astigmatic lens 118 is provided between the beam splitter 107 and the signal detecting photodetector 120. In the astigmatic lens 118, a curvature of a lens surface is not uniform, and a curvature in a longitudinal direction and a curvature in a transversal direction of the lens surface are different from each other, thereby generating astigmatism. The astigmatic lens 118 and the collimating lens 110 decrease a size of light beams received by the signal detecting photodetector 120. Further, the astigmatic lens 119 is inclined oppositely to the inclination of the beam splitter 107, in order to removed coma aberration generated in light passed through the beam splitter 107. A focusing error signal of the disc 115 is detected by an astigmatic method using astigmatism generated by the astigmatic lens 118.

Light emitted from the light source 103 and then transmitted by the beam splitter 107 is received by a monitoring photodetector 109 so that an amount of light emitted from the light source 103 is measured. Typically, about 91% or more of light emitted from the light source 103, for example, a laser diode, is reflected by the beam splitter 107, and the remainder of the light, that is, about 8-9% of the light is transmitted by the beam splitter 107 and detected by the monitoring photodetector 109.

The monitoring photodetector 109 is generally used in an optical pickup for a recording apparatus and operates as a light receiving element for monitoring recording light of a light source. That is, the monitoring photodetector 109 measures an amount of light emitted from the light source and, with this measurement, power of light used for recording information on a disc is controlled. Thus, if light other than the light emitted from the light source is received by the monitoring photodetector 109, the control of the power of the recording light is affected, resulting in a reduction in the performance of the recording and/or reproducing of the optical pickup.

When light reflected from the disc 115 is received by the signal detecting photodetector 120, a portion of the received light is reflected from a surface of the signal detecting photodetector 120. The light reflected from the signal detecting photodetector 120 is reflected from the beam splitter 107 and is received by the monitoring photodetector 109. The light reflected form the signal detecting photodetector 120 is referred to as feedback optical noise. The monitoring photodetector 109 cannot accurately measure an amount of recording light when feedback optical noise is present.

Figure 2:
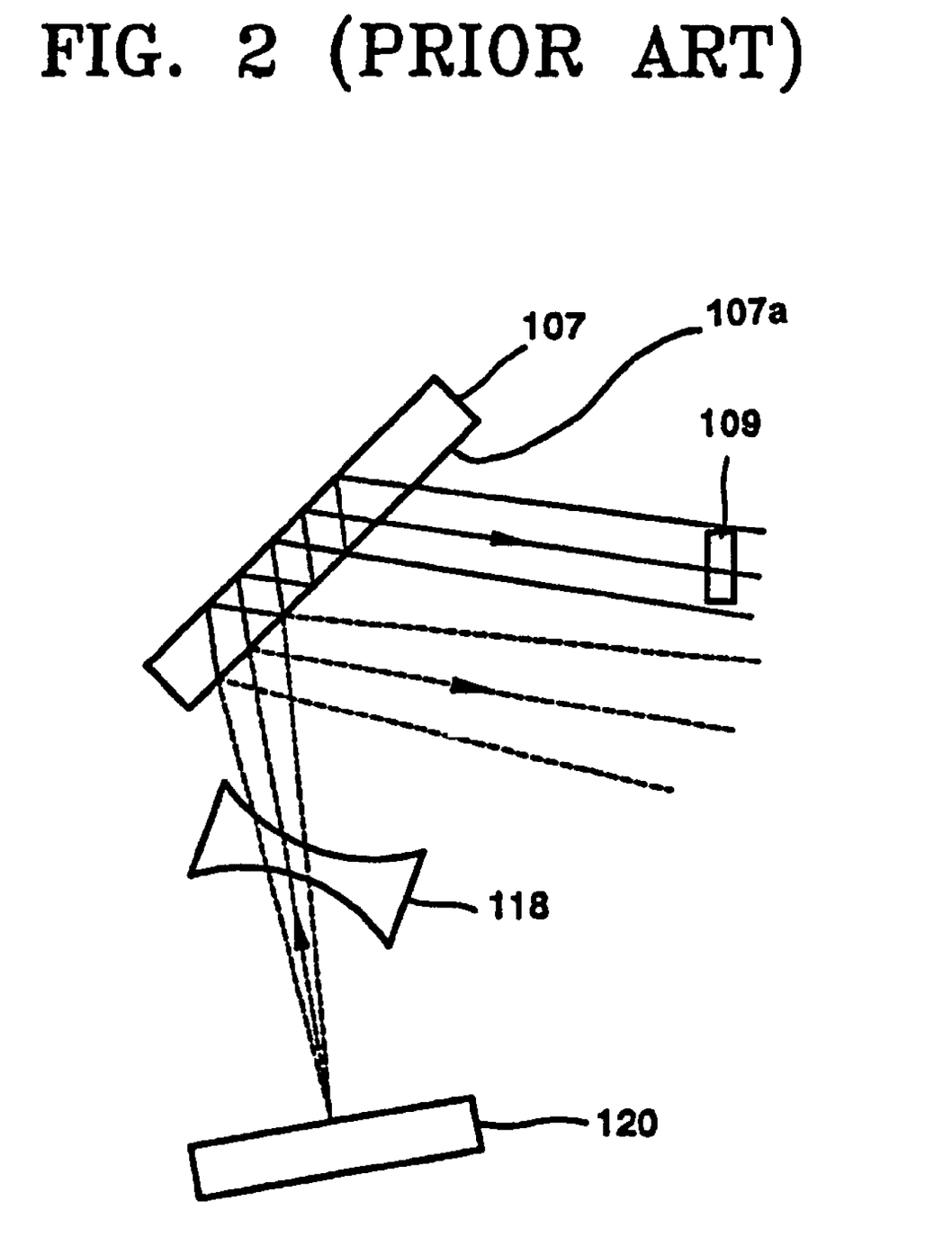
FIG. 2 shows an optical path of light reflected from a signal detecting photodetector when the signal detecting photodetector of FIG. 1 is inclined at an angle in order to cut off optical noise incident on a monitoring photodetector in the conventional optical pickup of FIG. 1.

Conventionally, in order to cut off the feedback optical noise, as shown in FIG. 2, the signal detecting photodetector 120 is inclined at an angle of about 2.5°. Light reflected from the inclined signal detecting photodetector 120 travels along an optical path different from that of the signal detecting photodetector 120 which is disposed flat (i.e., normal to the incident light) as shown in FIG. 1. Light reflected from the signal detecting photodetector 120 is not incident on the monitoring photodetector 109 due to the inclination of the signal detecting photodetector 120. Specifically, as indicated with dotted lines in FIG. 2, the light reflected from the signal detecting photodetector 120 is reflected from the beam splitter 107 and is not incident on the monitoring photodetector 109. That is, since the light reflected from the beam splitter 107 is not incident on the monitoring photodetector 109, the feedback optical noise can be cut off. However, a portion of the light reflected from the signal detecting photodetector 120 is transmitted inside the beam splitter 107, is reflected inside from the beams splitter 107, and is incident on the monitoring photodetector 109. Consequently, the feedback optical noise is not cut off completely. In FIG. 2, the light transmitted inside the beam splitter 107 is indicated with solid lines.

In the conventional method for cutting off the feedback optical noise, in addition to the above problem, since the signal detecting photodetector 120 is inclined to cut off the feedback optical noise incident on the monitoring photodetector 109, a shape of light beams incident on the signal detecting photodetector 120 is circular so that unbalance in a servo signal may be generated. Further, the monitoring photodetector 109 must be shifted to cut off the feedback optical noise incident on the monitoring photodetector 109 according to an angle of the inclination of the signal detecting photodetector 120. However, the monitoring photodetector 109 is much too small, and thus, it is very difficult to precisely manage an amount of shifting of the monitoring photodetector 109.

In order for light reflected from the signal detecting photodetector 120 and then reflected from the beam splitter 107 to not be incident on the monitoring photodetector 109, a nonreflecting coating may be applied on a reflecting surface 107a of the beam splitter 107. However, since a complete nonreflecting coating is difficult to make, the feedback optical noise incident on the monitoring photodetector 109 is difficult to cut off completely. Consequently, the recording performance of the optical pickup due to the feedback optical noise remains affected. Accordingly, adequate measures for completely cutting off the feedback optical noise reflected from the signal detecting photodetector 120 are required.

SUMMARY OF THE INVENTION

The present invention provides an optical pickup for cutting off optical noise by disposing a monitoring photodetector at a position such that light reflected from a signal detecting photodetector does not reach the monitoring photodetector, and an optical recording and/or reproducing apparatus using the same.

Additional aspects and/or advantages of the invention will be set forth in part in the description which follows and, in part, will be obvious from the description, or may be learned by practice of the invention.

According to an aspect of the present invention, there is provided an optical pickup including: a light source which emits light; a grating which separates a portion of the light emitted from the light source; a reflecting member which reflects another portion of the light emitted from the light source; a monitoring photodetector disposed on a traveling path of the light reflected from the reflecting member and which measures the reflected light; an optical path changer which changes an optical path of the light separated by the grating; an objective lens which condenses the light the optical path of which is changed onto a disc; and a signal detecting photodetector which receives the light reflected from the disc.

The reflecting member may be disposed on an optical path of light traveling outside an effective aperture of the grating to reflect ineffective light of light emitted from the light source.

According to another aspect of the present invention, there is provided an optical pickup, in which a portion of light emitted from a light source is condensed onto a disc by an objective lens so that information is recorded on the disc, and light reflected from the disc is received by a signal detecting photodetector so that focusing servo and tracking servo operations are performable. The optical pickup includes: a grating which separates the light emitted from the light source which passes through an effective aperture thereof; and a monitoring photodetector disposed on an optical path of at least a portion of the light traveling outside of the effective aperture and which measures a power of the at least a portion of the light traveling outside of the effective aperture.

According to yet another aspect of the present invention, there is provided an optical recording and/or reproducing apparatus including: a spindle motor which rotates a disc; an optical pickup which is movably disposed in a radial direction of the disc and records information onto and/or reproduces information from the disc; a driving unit which drives the spindle motor and the optical pickup; and a controller which controls focusing servo operations and tracking servo operations of the optical pickup. The optical pickup includes: a light source which emits light; a grating which separates a portion of the light emitted from the light source; a monitoring photodetector disposed on an optical path of light traveling outside of an effective aperture of the grating and which monitors a power of the light incident thereon; an optical path changer which changes an optical path of the light passed through the grating; an objective lens light which condenses light reflected from the optical path changer on a disc; and a signal detecting photodetector which receives the light reflected from the disc.

According to yet another aspect of the present invention, there is provided an optical recording and/or reproducing apparatus including: a spindle motor which rotates a disc; an optical pickup which is movably disposed in a radial direction of the disc and records information onto and/or reproduces information from the disc; a driving unit which drives the spindle motor and the optical pickup; and a controller which controls focusing servo operations and tracking servo operations of the optical pickup. The optical pickup includes a light source which emits light, a grating which separates a portion of the light emitted from the light source, a reflecting member which reflects another portion of the light emitted from the light source, a monitoring photodetector disposed on a traveling path of the light reflected from the reflecting member and which measures the reflected light, an optical path changer which changes an optical path of the light separated by the grating, an objective lens light which condenses the light the optical path of which is changed onto a disc, and a signal detecting photodetector which receives the light reflected from the disc.

According to yet another aspect of the present invention, there is provided a method of recording to and/or reproducing from an optical disc, including: emitting light; separating a portion of the emitted light; reflecting another portion of the light emitted from the light source which is not separated in the separating; measuring the light reflected by the reflecting; changing an optical path of the light separated by the separating; condenses the light changed by the changing onto a disc; and receiving the condensed light after the condensed light is reflected from the disc.

According to yet another aspect of the present invention, there is provided a method of recording onto and/or reproducing from an optical disc using an optical pickup in which a portion of light emitted from a light source is condensed on a disc by an objective lens so that information is recorded on the disc, and light reflected from the disc is received by a signal detecting photodetector so that focusing servo and tracking servo operations are performable. The method includes: separating light emitted from the light source which passes through an effective aperture; and measuring at least a portion of the light traveling outside of the effective aperture of the grating and which measures a power of the at least a portion of the light traveling outside of the effective aperture.

According to yet another aspect of the present invention, there is provided an optical pickup including: a light source which emits light; an optical path changer which changes an optical path of a portion of the light so as to direct the light toward an optical disc; a monitoring photodetector disposed between the light source and the optical path changer and which detects another portion of the light; and a signal detecting photodetector which receives the light reflected from the disc. Optical noise reflected from a signal detecting photodetector is not read by the monitoring photodetector.

According to yet another aspect of the present invention, there is provided an optical pickup including: a light source which emits light; an optical path changer which changes an optical path of a portion of the light so as to direct the light toward an optical disc; a monitoring photodetector disposed one of between the light source and the optical path changer and on an optical path of light reflected by a reflecting member disposed between the light source and the optical path changer and which detects another portion of the light; and a signal detecting photodetector which receives the light reflected from the disc. Optical noise reflected from a signal detecting photodetector is not read by the monitoring photodetector.

BRIEF DESCRIPTION OF THE DRAWINGS

These and/or other aspects and advantages of the invention will become apparent and more readily appreciated from the following description of the embodiments taken in conjunction with the accompanying drawings in which.

DETAILED DESCRIPTION OF THE PREFERRED EMBODIMENTS

Reference will now be made in detail to embodiments of the present invention, examples of which are illustrated in the accompanying drawings, wherein like reference numerals refer to the like elements throughout. The embodiments are described below to explain the present invention by referring to the figures.

Figure 3:
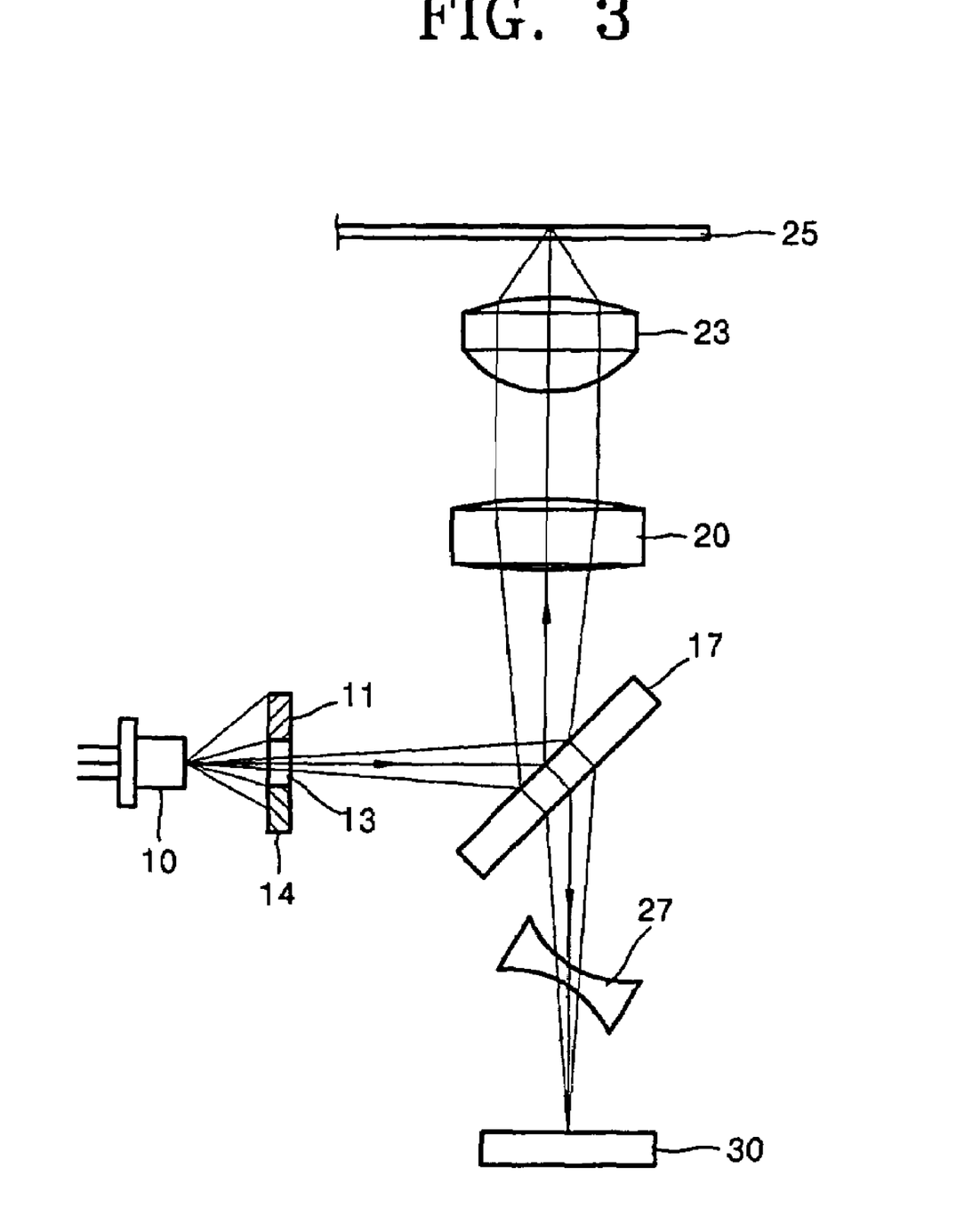
FIG. 3 is a schematic structure view of an optical pickup for cutting off optical noise according to a first embodiment of the present invention.

Referring to FIG. 3, an optical pickup according to a first embodiment of the present invention includes a light source 10, a grating 13 for separating light emitted from the light source 10 into three beams, and an optical path changer 17 for changing an optical path of light by transmitting or reflecting light passed through the grating 13. Further, a monitoring photodetector 11 is disposed on an optical path of light traveling outside an effective aperture of the grating 13 between the light source 10 and the optical path changer 17.

A laser diode may be used, for example, as the light source 10. The light source 10 emits divergent light, and a portion of light emitted therefrom travels toward a disc 25 after passing through an effective aperture of the grating 13. The remainder of the light which does not pass through a range of the effective aperture of the grating 13 is ineffective light which does not contribute to recording information on the disc 25. In order to monitor power of recording light using the ineffective light, the monitoring photodetector 11 is disposed on a traveling path of the ineffective light traveling outside the effective aperture of the grating 13.

Although the monitoring photodetector 11 is shown disposed adjacent to a sidewall of the grating 13 in FIG. 3, it is to be understood that the monitoring photodetector 11 may be disposed at any position between the light source 10 and the optical path changer 17. Reference numeral 14 denotes a stop for cutting off light passing through a lateral portion of the grating 13.

The optical pickup according to the first embodiment of the present invention further includes an optical path changer 17, an objective lens 23 for condensing light traveling along the optical path changed by the optical path changer 17 on the disc 25, and a signal detecting photodetector 30 for receiving light reflected from the disc 25 and then passed through then the objective lens 23 and the optical path changer 17. A collimating lens 20 is disposed on an optical path between the objective lens 23 and the optical path changer 17 and makes incident light into parallel light. An astigmatic lens 27 is disposed on an optical path between the optical path changer 17 and the signal detecting photodetector 30.

Light passed through the grating 13 is transmitted through or reflected by the optical path changer 17 so that an optical path of the light is changed. The light traveling along the optical path changed by the optical path changer 17 is condensed on the disc 25 by the objective lens 23. Thereafter, light reflected from the disc 25 passes through then the objective lens 23 and the optical path changer 17 and is incident on the signal detecting photodetector 30. Information recorded on the disc 25 is reproduced on focusing servo and tracking servo are performed using a photoelectric transformation signal generated by the signal detecting photodetector 30. At this time, even if a portion of the light incident on the signal detecting photodetector 30 is reflected, the reflected light is not incident on the monitoring photodetector 11.

The optical path changer 17, for example, may be a beam splitter which reflects or transmits incident light by a ratio according to a reflective coating of the beam splitter, or a polarized beam splitter which reflects or transmits incident light according to a polarization direction of the incident light.

Figure 4:
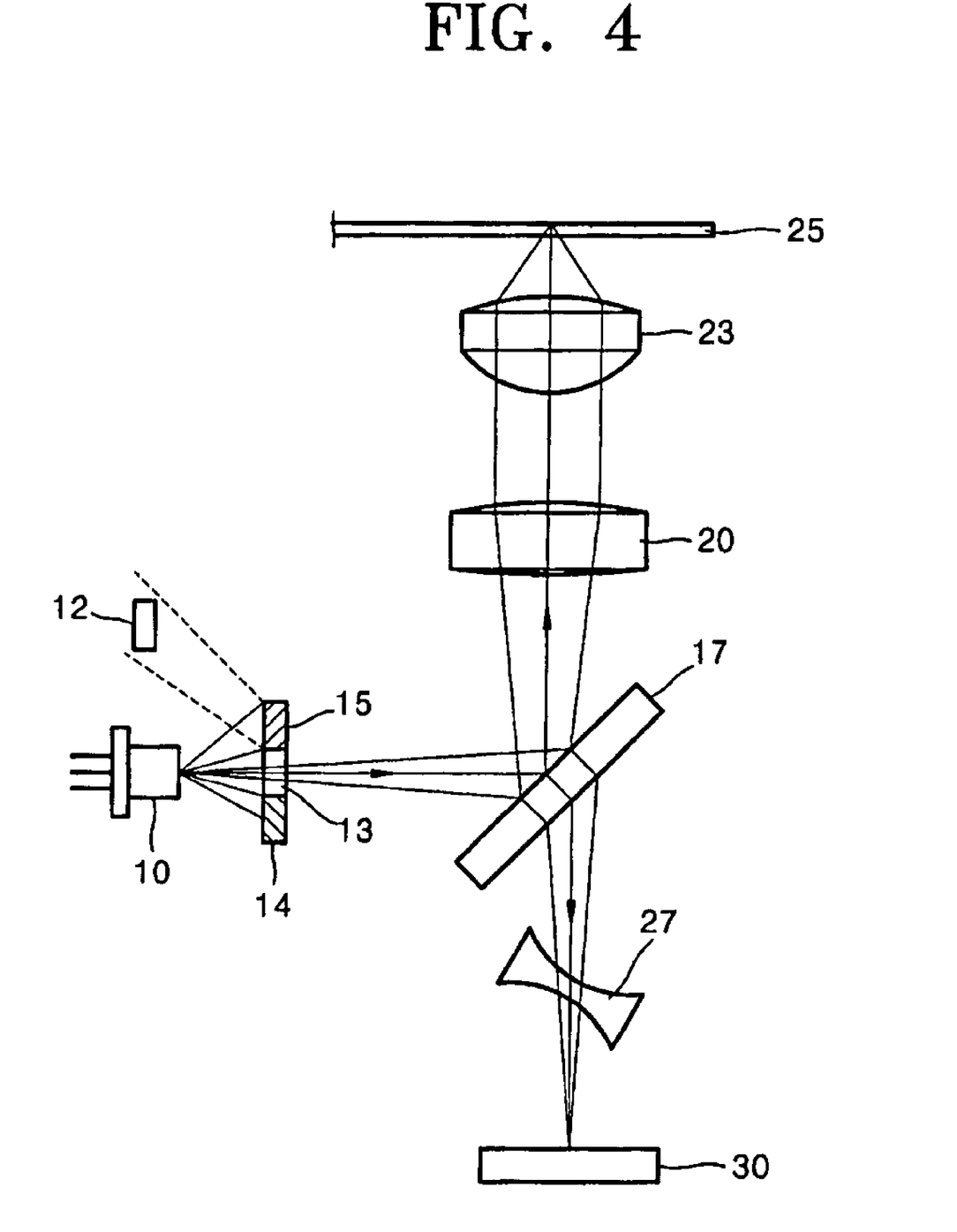
FIG. 4 shows an optical pickup for cutting off optical noise according to a second embodiment of the present invention.

An optical pickup according to a second embodiment of the present invention, as shown in FIG. 4, includes a light source 10, a grating 13, and an optical path changer 17. Further, a reflecting member 15 is disposed between the light source 10 and the optical path changer 17, and a monitoring photodetector 12 is disposed on a traveling path of light reflected from the reflecting member 15. In FIG. 4, the same reference numerals as those in FIG. 3 represent the same elements, and thus their descriptions will be omitted.

The reflecting member 15 is disposed on an optical path of light emitted from the light source 10 and then traveling outside an effective aperture of the grating 13. When the reflecting member 15 is disposed in this manner, it uses ineffective light of light emitted from the light source 10 as described in the first embodiment of the present invention. The reflective member may be, for example, a mirror. A portion of light emitted from the light source 10 travels toward a disc 25 after passing through the effective aperture of the grating 13, and the remainder of the light is reflected from the reflecting member 15 and incident on the monitoring photodetector 12. Power of recording light for recording information on the disc 25 is controlled using a signal detected by the monitoring photodetector 12.

The reflecting member 15 is provided around the grating 13. Particularly, the reflecting member 15 is disposed on the traveling path of light traveling outside the effective aperture of the grating 13 so that power of recording light is monitored using ineffective light which is not used for recording information, thereby increasing an optical efficiency of the optical pickup.

The reflecting member 15 is disposed only in a portion of a peripheral portion of the grating 13. The reflecting member 15 is disposed such that a portion of light reflected from the reflecting member 15 is incident on the monitoring photodetector 12. In FIG. 4, light reflected from the reflecting member 15 and then incident on the monitoring photodetector 12 is indicated with dotted lines.

If the power of the recording light measured by the monitoring photodetector 12 is lower or higher than a reference power, the power of the light source 10 is controlled so that the power of the recording light is controlled to maintain a power required for recording information.

Light passed through the grating 13 is reflected from the optical path changer 17, passes through the collimating lens 20 and the objective lens 23, and is condensed on the disc 25 so that information is recorded on the disc 25. Next, light reflected from the disc 25 passes through the objective lens 23, the collimating lens 20, and the optical path changer 17, and is focused on a signal detecting photodetector 30.

Focusing servo and tracking servo operations are performed using a light signal focused on a signal detecting photodetector 30. At this time, even if a portion of the light incident on the signal detecting photodetector 30 is reflected, the reflected light is not incident on the monitoring photodetector 11.

Figure 5:
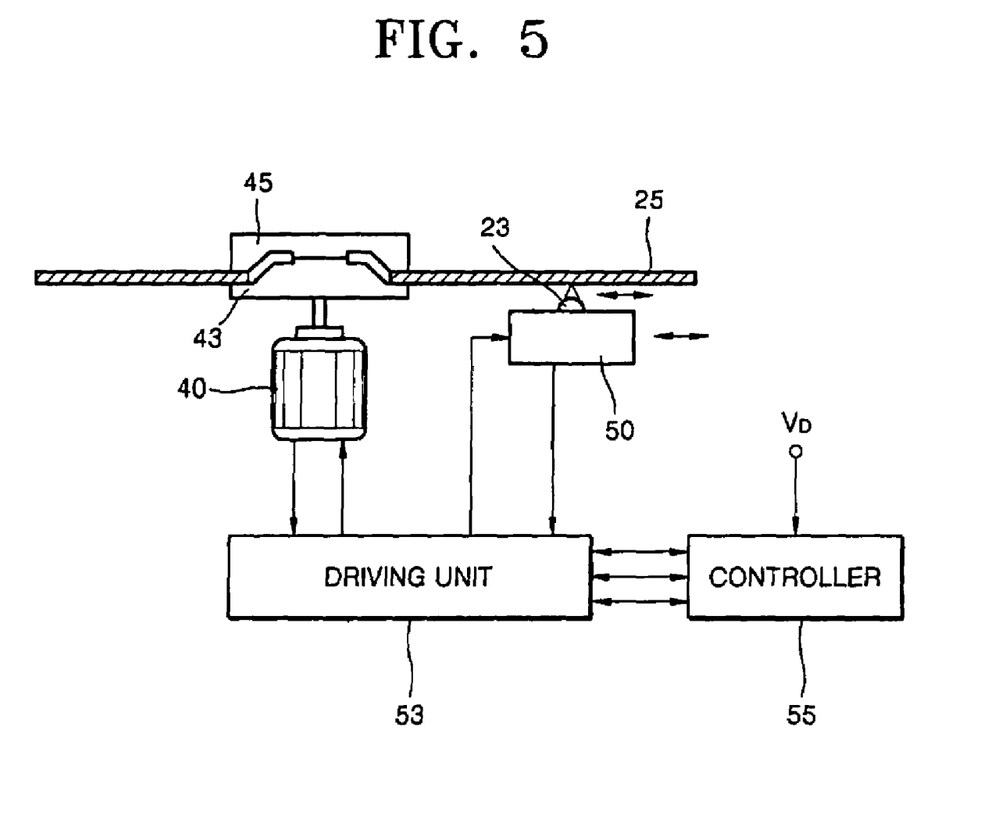
FIG. 5 schematically shows an optical recording and/or reproducing apparatus using an optical pickup shown in FIGS. 3 and 4 according to the present invention.

Referring to FIG. 5, an optical recording and/or reproducing apparatus using an optical pickup 50 according to an embodiment of the present invention is configured such that a spindle motor 40 for rotating a disc 25 is installed under a turntable 43, the disc 25 is placed on the turntable 43, and a clamp 45 for chucking the disc 25 via an interaction between the disc 25 and the turntable 43 is installed oppositely to the turntable 43. When the disc 25 is rotated by the spindle motor 40, the optical pickup 50 is installed movably in a radial direction of the disc 25 so that information is recorded on the disc 25 or the information recorded on the disc 25 is reproduced.

The spindle motor 40 and the optical pickup 50 are driven by a driving unit 53. Focusing servo and tracking servo operations of the optical pickup 50 are controlled by a controller 55 so that information recording on and/or reproducing from the disc 25 are performed.

The optical pickup according to the first embodiment (refer to FIG. 3) or the second embodiment (refer to FIG. 4) of the present invention may be used as the optical pickup 50.

In the optical pickup according to the first embodiment of the present invention, the monitoring photodetector 11 is provided on an optical path of light traveling outside the effective aperture of the grating 13 between the light source 10 and the optical path changer 17. In the optical pickup according to the second embodiment of the present invention, the reflecting member 15 is provided on an optical path of light traveling outside the effective aperture of the grating 13 between the light source 10 and the optical path changer 17, and the monitoring photodetector 12 is provided on a traveling path of light reflected from the reflecting member 15.

In the optical pickup 50 according to the present invention, a photoelectric transformation signal generated in the signal detecting photodetector 30 is input to the controller 55 through the driving unit 53. The driving unit 53 controls a rotation speed of the spindle motor 40, amplifies the input photoelectric transformation signal, and drives the optical pickup 50. The controller 55 sends focusing servo instructions and tracking servo instructions adjusted based on the photoelectric transformation signal input from the driving unit 53 to the driving unit 53 so that the focusing servo and the tracking servo are performed.

As described above, since a monitoring photodetector for monitoring power of recording light is disposed not to be affected by optical noise, accurate monitoring can be performed.

According to an optical pickup and an optical recording and/or reproducing apparatus using the same, since the monitoring photodetector is disposed between a light source and an optical path changer, optical noise reflected from a signal detecting photodetector does not affect the monitoring photodetector. Thus, power of recording light can be measured exactly, and also a recording performance of the optical pickup can be improved.

Further, since optical noise can be cut off completely by disposing the monitoring photodetector around a grating or having a reflecting member, the method of cutting off optical noise according to the present invention is simpler than a conventional method, thereby reducing manufacturing cost. Since the signal detecting photodetector does not need to be inclined at a predetermined angle, unbalance of a servo signal can be prevented.

Furthermore, since power of recording light is monitored using an effective light of light emitted from the light source which is not used for recording information on a disc, an optical efficiency of the optical pickup increases.

Although a few embodiments of the present invention have been shown and described, the present invention is not limited to the disclosed embodiments. Rather, it would be appreciated by those skilled in the art that changes may be made in this embodiment without departing from the principles and spirit of the invention, the scope of which is defined by the claims and their equivalents.

What is claimed is:

1. An optical pickup light condensing recording system, comprising:
   a light source which emits light;
   a grating which separates a portion of the light emitted from the light source;
   a reflecting member which reflects another portion of the light emitted from the light source;
   a monitoring photodetector disposed on a traveling path of the light reflected from the reflecting member and which measures the reflected light;
   an optical path changer which changes an optical path of the light separated by the grating;
   an objective lens which condenses the light, the optical path of which is changed onto a disc; and
   a signal detecting photodetector which receives the condensed light reflected from the disc,
   wherein the signal detecting photodetector is arranged such that optical noise due to reflection of light by the signal detecting photodetector is not received by the monitoring photodetector, enabling the monitoring photodetector to accurately determine a power of recording light,
   wherein focusing servo and tracking servo operations are performed using a light signal output by the signal detecting photodetector based at least partially on light reflected from the disc, and
   wherein the reflecting member is disposed around the grating, and
   wherein the grating has an effective aperture through which the portion of the light which is separated passes, wherein any portion of the light traveling outside of the effective aperture is ineffective light, and wherein the reflecting member is disposed on an optical path of at least a portion of the ineffective light and reflects the least a portion of the ineffective light.

2. The optical pickup of claim 1, wherein the light source is a laser diode.

3. The optical pickup of claim 1, wherein the reflective member is a mirror.

4. The optical pickup of claim 1, wherein the reflecting member is disposed only in a portion of a peripheral portion of the grating.

5. The optical pickup of claim 1, wherein the optical path changer is one of a beam splitter which reflects or transmits incident light by a ratio according to a reflective coating of the beam splitter and a polarized beam splitter which reflects or transmits incident light according to a polarization direction of the incident light.

6. The optical pickup of claim 1, wherein the signal detecting photodetector detects a focusing servo signal and a tracking servo signal from the received reflected light.

7. The optical pickup of claim 1, further comprising a collimating lens which is disposed on an optical path between the optical path changer and the objective lens and converts incident thereon light into parallel light.

8. The optical pickup of claim 1, wherein it is determined whether a power of the light measured by the monitoring photodetector is lower or higher than a reference value, and when a power of the light measured by the monitoring photodetector is one of lower and higher than the reference value, the power of the light source is controlled so that the power of the light measured by the monitoring photodetector is the reference value.

9. An optical pickup light condensing recording system, in which a portion of light emitted from a light source is condensed onto a disc by an objective lens so that information is recorded on the disc, and light reflected from the disc is received by a signal detecting photodetector so that focusing servo and tracking servo operations are performable, comprising:
 a grating which separates the light emitted from the light source which passes through an effective aperture thereof; and
 a monitoring photodetector disposed on an optical path of at least a portion of the light traveling outside of the effective aperture and which measures a power of the at least a portion of the light traveling outside of the effective aperture,
 wherein the signal detecting photodetector is arranged such that optical noise due to reflection of light by the signal detecting photodetector is not received by the monitoring photodetector, enabling the monitoring photodetector to accurately determine a power of recording light,
 wherein focusing servo and tracking servo operations are performed using a light signal output by the signal detecting photodetector based at least partially on light reflected from the disc, and
 wherein the monitoring photodetector is adjacent to an outer sidewall of the grating, and
 wherein the grating has an effective aperture through which the portion of the light which is separated passes, wherein any portion of the light traveling outside of the effective aperture is ineffective light, and wherein the reflecting member is disposed on an optical path of at least a portion of the ineffective light and reflects the least a portion of the ineffective light.

10. The optical pickup of claim 9, wherein the light source is a laser diode.

11. The optical pickup of claim 9, further comprising an optical path changer disposed between the grating and the objective lens and changes an optical path of light incident thereon.

12. The optical pickup of claim 11, further comprising a collimating lens which is disposed on an optical path between the optical path changing unit and the objective lens and makes incident light thereon into parallel light.

13. The optical pickup of claim 9, wherein the optical path changer is one of a beam splitter which reflects or transmits incident light by a ratio according to a reflective coating of the beam splitter and a polarized beam splitter which reflects or transmits incident light according to a polarization direction of the incident light.

14. The optical pickup of claim 9, wherein the signal detecting photodetector detects a focusing servo signal and a tracking servo signal from the received reflected light.

15. The optical pickup of claim 9, further comprising a stop which blocks light passing through a lateral portion of the grating.

16. The optical pickup of claim 9, wherein it is determined whether a power of the light measured by the monitoring photodetector is lower or higher than a reference value, and when a power of the light measured by the monitoring photodetector is one of lower and higher than the reference value, the power of the light source is controlled so that the power of the light measured by the monitoring photodetector is the reference value.

17. An optical pickup light condensing recording system, comprising:
 a light source which emits light;
 an optical path changer which changes an optical path of a portion of the light so as to direct the light toward an optical disc;
 a monitoring photodetector disposed between the light source and the optical path changer and which detects another portion of the light; and
 a signal detecting photodetector which receives the light reflected from the disc,
 wherein optical noise reflected from the signal detecting photodetector is not read by the monitoring photodetector,
 wherein focusing servo and tracking servo operations are performed using a light signal output by the signal detecting photodetector based at least partially on light reflected from the disc, and
 wherein the monitoring photodetector is adjacent to an outer sidewall of a grating which separates the light emitted from the light source which passes through an effective aperture thereof, and
 wherein the grating has an effective aperture through which the portion of the light which is separated passes, wherein any portion of the light traveling outside of the effective aperture is ineffective light, and wherein the reflecting member is disposed on an optical path of at least a portion of the ineffective light and reflects the least a portion of the ineffective light.

18. An optical pickup light condensing recording system, comprising:
 a light source which emits light;
 an optical path changer which changes an optical path of a portion of the light so as to direct the light toward an optical disc;
 a monitoring photodetector disposed one of between the light source and the optical path changer and on an optical path of light reflected by a reflecting member disposed between the light source and the optical path changer and which detects another portion of the light; and a signal detecting photodetector which receives the light reflected from the disc, wherein optical noise reflected from the signal detecting photodetector is not read by the monitoring photodetector, wherein focusing servo and tracking servo operations are performed using a light signal output by the signal detecting photodetector based at least partially on light reflected from the disc, and wherein the reflecting member is disposed around a grating which separates a portion of the light emitted from the light source, and wherein the grating has an effective aperture through which the portion of the light which is separated passes, wherein any portion of the light traveling outside of the effective aperture is ineffective light, and wherein the reflecting member is disposed on an optical path of at least a portion of the ineffective light and reflects the least a portion of the ineffective light.

* * * * *

UNITED STATES PATENT AND TRADEMARK OFFICE
CERTIFICATE OF CORRECTION

| | |
|---|---|
| PATENT NO. | : 7,355,953 B2 |
| APPLICATION NO. | : 10/686785 |
| DATED | : April 8, 2008 |
| INVENTOR(S) | : Ui-yol Kim et al. |

Page 1 of 1

It is certified that error appears in the above-identified patent and that said Letters Patent is hereby corrected as shown below:

Column 9, Line 19, change "claim 1,further" to --claim 1, further--.

Signed and Sealed this

Second Day of September, 2008

JON W. DUDAS
*Director of the United States Patent and Trademark Office*